UNITED STATES PATENT OFFICE.

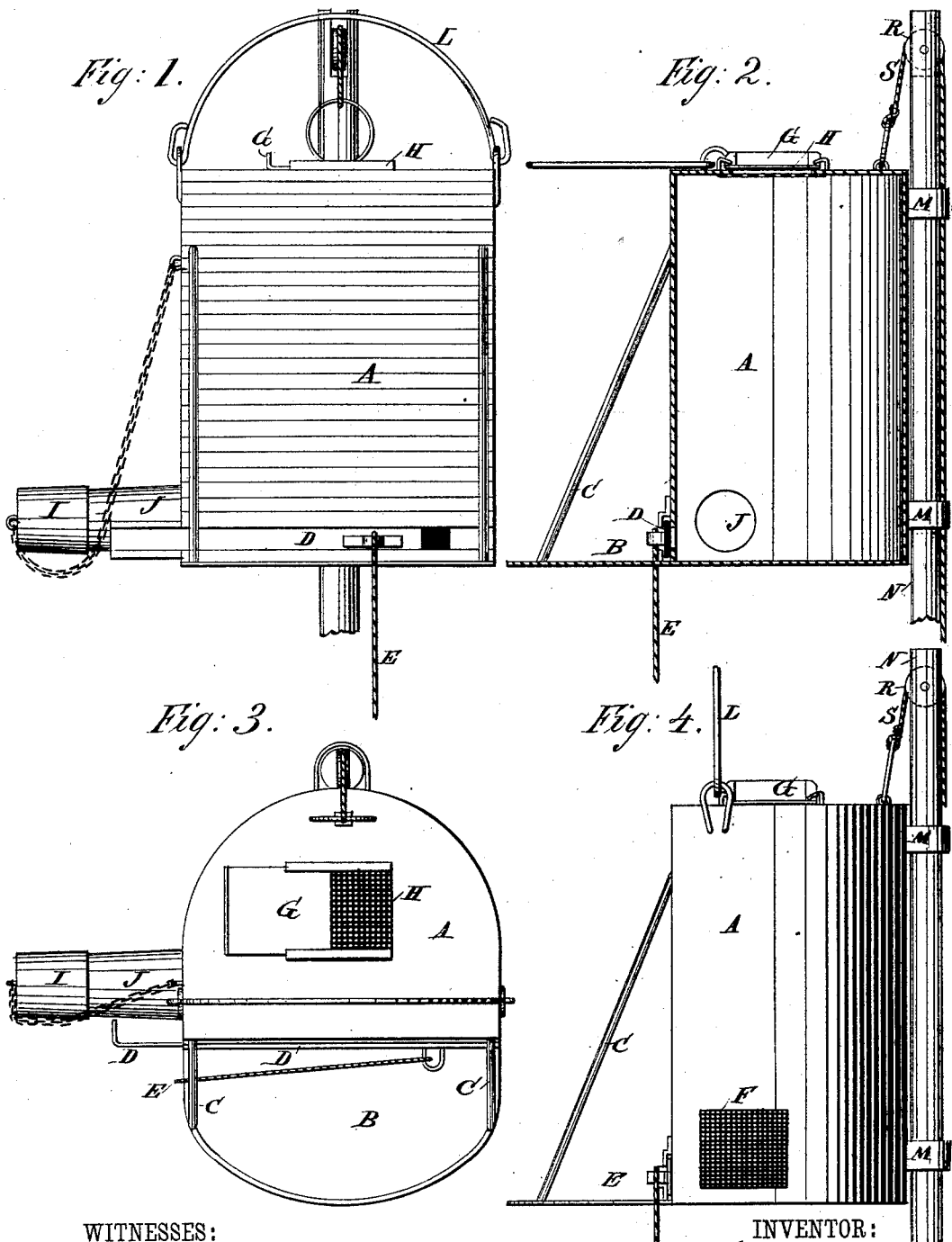

GIDEON C. FINLEY AND SARAH E. FINLEY, OF PETERSBURG, TENNESSEE.

BEE-BUCKET.

SPECIFICATION forming part of Letters Patent No. 223,330, dated January 6, 1880.

Application filed May 6, 1879.

*To all whom it may concern:*

Be it known that we, GIDEON C. FINLEY and SARAH E. FINLEY, of Petersburg, in the county of Lincoln and State of Tennessee, have invented a new and useful Improvement in Bee-Buckets, of which the following is a specification.

The object of our invention is to provide a bucket for taking bees from the hives to arrange the comb, for carrying them from one place to another, and for capturing bees in case of swarming on trees.

The invention consists in a bucket for transporting and capturing bees, having openings for the entrance and exit of the bees, an apron before the entrance-slide, and openings for ventilation. The bucket is so arranged that it can be pulled to the top of a long pole, and so brought right to the spot where the bees to be captured are.

In the drawings, Figure 1 is a front view of the bucket. Fig. 2 is a section from front to rear. Fig. 3 is a top view. Fig. 4 is a side view.

Similar letters of reference indicate corresponding parts.

A is the bucket. B is the apron, secured by the braces C C. D is a slide for opening and closing the hole through which the bees enter the bucket. The same is operated by pulling the cord E in one direction or the other.

When the slide D is closed the bucket can be carried anywhere without any injury to the bees, for they have ventilation by means of the screen F. If the bees are to leave the bucket, the slide G is removed from the screen H and smoke forced into the bucket through this screen.

J is a spout through which the bees are to leave the bucket, and I is a thimble closing the same until it is desired to let the bees out.

On the rear of the bucket there are two loops or rings, M M, in which a pole, N, can slide. On the top of this pole there is a pulley-sheave, R, and over this pulley-sheave the cord S passes and is fastened to a ring on the bucket.

The operation is as follows: The bucket is pulled to the top of the pole N by means of the cord S, and the cord is then secured, so that the bucket will stay in that position, the rings M M guiding it. By means of the pole the bucket can be placed directly under the bees to be captured, and the same are scooped or brushed from the tree onto the apron B. The slide D being open, the bees enter into the bucket. By means of the cord E the slide is closed, and the bucket lowered and carried to the hive. The thimble I is removed, and spout J is put into an opening in the hive, the slide G removed, and smoke admitted into the bucket A through the wire screen. This causes the bees to go from the bucket through the spout J into the hive.

In the same manner that bees are taken from a tree they can be taken from a hive and transported any distance without injury to the bees or the person carrying them.

Having thus described our invention, we claim as new and desire to secure by Letters Patent—

A bee-bucket provided with an apron, B, a slide for the entrance, and a spout for the exit, of the bees, for the purpose and as set forth.

GIDEON C. FINLEY.
SARAH E. FINLEY.

Witnesses:
JAMES T. LUNO,
HENRY W. HAMPTON.